(12) United States Patent
Yanase et al.

(10) Patent No.: US 7,198,543 B2
(45) Date of Patent: Apr. 3, 2007

(54) GEAR GRINDING MACHINE

(75) Inventors: Yoshikoto Yanase, Ritto (JP); Koichi Masuo, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 83 days.

(21) Appl. No.: 11/175,330

(22) Filed: Jul. 7, 2005

(65) Prior Publication Data

US 2006/0014474 A1    Jan. 19, 2006

(30) Foreign Application Priority Data

Jul. 15, 2004    (JP) .............................. 2004-208097

(51) Int. Cl.
*B24B 1/00*    (2006.01)
(52) U.S. Cl. .............................. 451/5; 451/21; 451/47; 451/56; 451/443
(58) Field of Classification Search .................. 451/21, 451/5, 47, 56, 72, 236, 253, 443, 127, 166, 451/147, 219, 275; 409/73, 77, 183, 11, 409/33; 125/11.04
See application file for complete search history.

(56) References Cited

U.S. PATENT DOCUMENTS

| | | | | |
|---|---|---|---|---|
| 4,631,870 A | * | 12/1986 | Sun ................................ | 451/5 |
| 4,961,289 A | * | 10/1990 | Sulzer ......................... | 451/219 |
| 4,991,353 A | * | 2/1991 | Wiener ......................... | 451/11 |
| 5,076,020 A | * | 12/1991 | Negri ........................... | 451/21 |
| 5,323,572 A | * | 6/1994 | Guenin ......................... | 451/21 |
| 6,217,409 B1 | * | 4/2001 | Stadtfeld et al. ............... | 451/5 |
| 6,379,217 B1 | * | 4/2002 | Thyssen ....................... | 451/5 |

\* cited by examiner

*Primary Examiner*—George Nguyen
(74) *Attorney, Agent, or Firm*—Birch, Stewart, Kolasch & Birch, LLP

(57) ABSTRACT

A gear grinding machine comprises: a moving mechanism rotatably mounted with a threaded grinding wheel, and arranged to move the threaded grinding wheel along directions of X, Z, and Y, and to turn the threaded grinding wheel in a Y-Z plane; an NC device for controlling the position of the threaded grinding wheel; and a rotary dressing device having a dressing tool which contacts the flanks of the threads of the threaded grinding wheel, while rotationally driven, to perform dressing. The NC device numerically controls the moving mechanism so as to adjust the positions in the directions of X and Z, and the turning position in the Y-Z plane of the threaded grinding wheel, while keeping contact of the dressing tool with the flanks of the threads of the threaded grinding wheel, in order to modify the wheel pressure angle of the threaded grinding wheel.

2 Claims, 7 Drawing Sheets

Plane $\pi_1$, Plane $\pi_2$ : y-z Plane
$\gamma$ : Axis-to-axis angle m' is on plane $\pi_1'$
l' is on plane $\pi_2'$
Planes $\pi_1'$ and $\pi_2$ are parellel
(same normal vector)

GEAR GRINDING MACHINE

BACKGROUND OF THE INVENTION

1. Field of the Invention

This invention relates to a gear grinding machine arranged to perform grinding using a threaded grinding wheel, and equipped with a rotary dressing device. The gear grinding machine can modify the wheel pressure angle of the threaded grinding wheel with high accuracy by use of numerical control.

2. Description of the Related Art

A gear grinding machine, in which a gear-shaped workpiece after heat treatment is ground by "a threaded grinding wheel," a gear grinding tool, to finish a gear, has so far been known. The threaded grinding wheel is an annular grinding wheel having threads (rack teeth) formed spirally on its outer peripheral surface. Grinding is performed, with the positions in an orthogonal coordinate system (positions on the X-axis, Y-axis and Z-axis) of the threaded grinding wheel, and the rotational speed of the threaded grinding wheel being numerically controlled.

As grinding proceeds, the threaded grinding wheel wears, and its sharpness decreases. Thus, after the threaded grinding wheel has ground many gears continuously, the worn-out threaded grinding wheel needs to be dressed by a dressing device to regenerate a sharp cutting edge.

Some gear grinding machines are equipped with dressing devices. Among the dressing devices is a rotary dressing device provided with a rotationally driven disk-shaped dressing tool. With this rotary dressing device, the disk-shaped dressing tool is kept rotationally driven, and brought into contact with the flank of the thread of the threaded grinding wheel being rotated, thereby carrying out dressing.

To modify the tooth profile pressure angle of the gear to be ground, the wheel pressure angle of the threaded grinding wheel has to be modified. Modification of the wheel pressure angle of the threaded grinding wheel is made by dressing the threaded grinding wheel by the dressing device.

To modify the wheel pressure angle, it suffices to turn (turn about a vertical axis (Z-axis)) the disk-shaped dressing tool in contact with the thread of the threaded grinding wheel, although details will be described later.

Among gear grinding machines, therefore, are those of the type having a mechanism for turning the rotary dressing device. With the gear grinding machine having such a turning mechanism, an operator manually turns the rotary dressing device (dressing tool) about the Z-axis by use of a block gauge, which is a tool for turning, to modify the wheel pressure angle.

The necessity for the operator's manual work for turning the rotary dressing device (dressing tool) in order to modify the wheel pressure angle, however, may result in poor accuracy.

Moreover, a gear grinding machine of the type, which cannot turn the rotary dressing device, has hitherto been unable to modify the wheel pressure angle.

The present invention has been accomplished in light of the above-described problems with the earlier technologies. An object of the present invention is to provide a gear grinding machine which can modify the wheel pressure angle of a threaded grinding wheel by moving the position of the threaded grinding wheel to a predetermined position while fixing the position of a dressing tool of a rotary dressing device.

SUMMARY OF THE INVENTION

An aspect of the present invention is to provide a gear grinding machine, comprising:

a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to a work machining position, a Z-direction being a vertical direction, and a Y-direction being a direction perpendicular to the X-direction and the Z-direction, and to turn the threaded grinding wheel in a Y-Z plane;

an NC device for numerically controlling the movement of the moving mechanism in order to control the position of the threaded grinding wheel mounted on the moving mechanism; and a rotary dressing device having a disk-shaped dressing tool, and arranged such that when the rotary dressing device is set at the work machining position, the dressing tool contacts the flanks of the threads of the threaded grinding wheel, while being rotationally driven, to perform dressing, and wherein the NC device has a control function of numerically controlling the moving mechanism so as to adjust the position in the X-direction, the position in the Z-direction, and the turning position in the Y-Z plane of the threaded grinding wheel, while keeping the state of contact of the dressing tool with the flanks of the threads of the threaded grinding wheel, in order to modify the wheel pressure angle of the threaded grinding wheel.

Another aspect of the present invention is to provide a gear grinding machine, comprising:

a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to a work machining position, a Z-direction being a vertical direction, and a Y-direction being a direction perpendicular to the X-direction and the Z-direction, and to turn the threaded grinding wheel in a Y-Z plane;

an NC device for numerically controlling the movement of the moving mechanism in order to control the position of the threaded grinding wheel mounted on the moving mechanism; and a rotary dressing device having a disk-shaped dressing tool, and arranged such that when the rotary dressing device is set at the work machining position, the dressing tool contacts the flanks of the threads of the threaded grinding wheel, while being rotationally driven, to perform dressing, and wherein the NC device has a control function of numerically controlling the moving mechanism so as to adjust the position in the X-direction, the position in the Z-direction, and the turning position in the Y-Z plane of the threaded grinding wheel, while keeping the state of contact of the dressing tool with the flanks of the threads of the threaded grinding wheel, and has a control function of numerically controlling the moving distance in the Y-direction of the threaded grinding wheel per rotation of the threaded grinding wheel, in order to modify the wheel pressure angle of the threaded grinding wheel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

First of all, the features and general actions of a gear grinding machine, to which the present invention has been applied, will be described with reference to FIGS. 1 to 5(a), 5(b).

Figure 1:
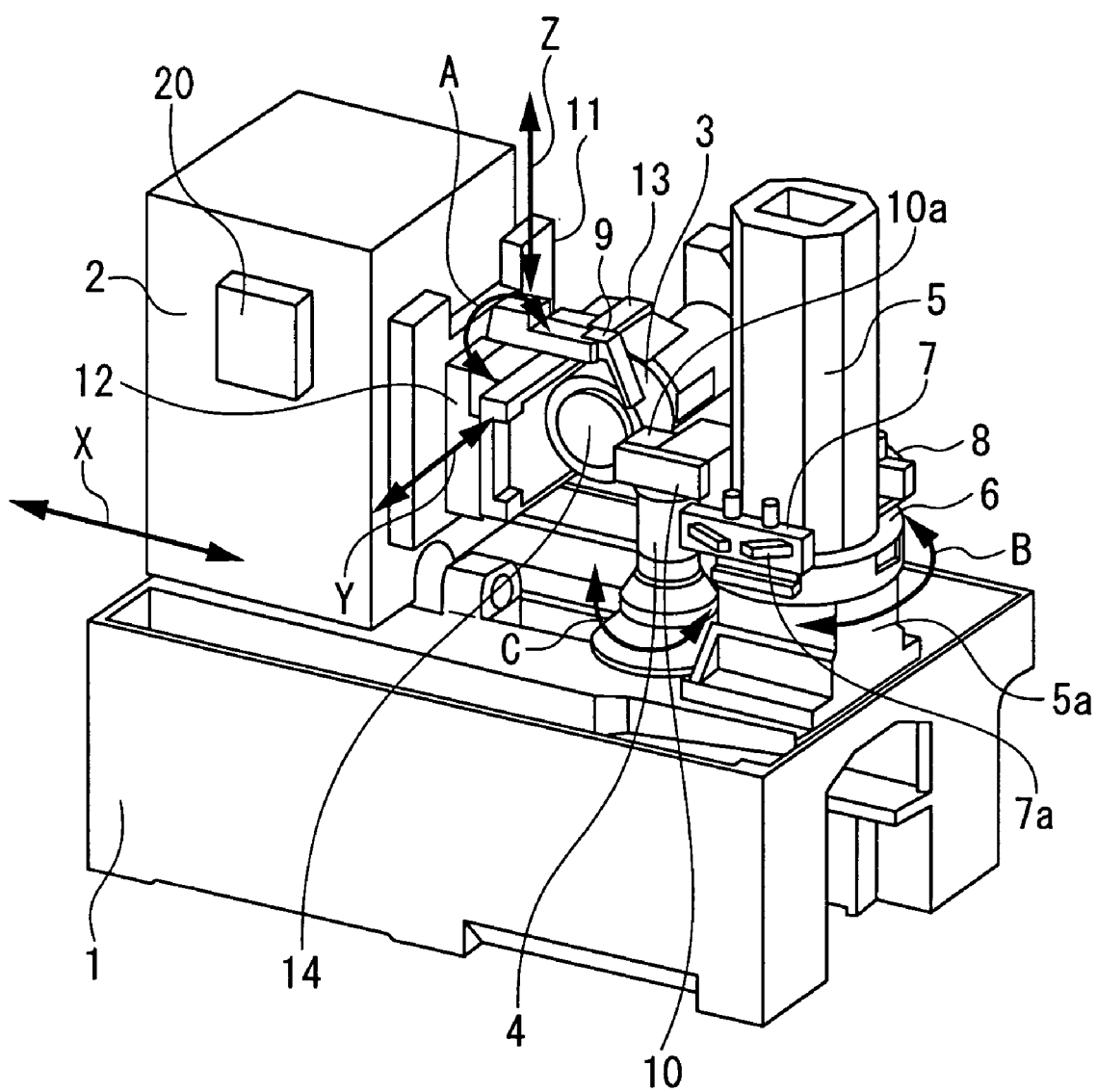
FIG. 1 is a perspective view showing a gear grinding machine.

FIG. 1 is a perspective view of a gear grinding machine according to an embodiment of the present invention having a threaded grinding wheel (worm grinding wheel) 3 mounted thereon. This view illustrates a state in which the threaded grinding wheel 3 is dressed (ground for regeneration) by a pair of dressing tools 10a and 10b provided in a rotary dressing device 10. The threaded grinding wheel 3 of an annular shape has rack teeth (spiral threads) on the outer peripheral surface thereof, and these rack teeth engage a work (gear to be ground) W to carry out gear grinding (see FIG. 4).

Figure 2A:
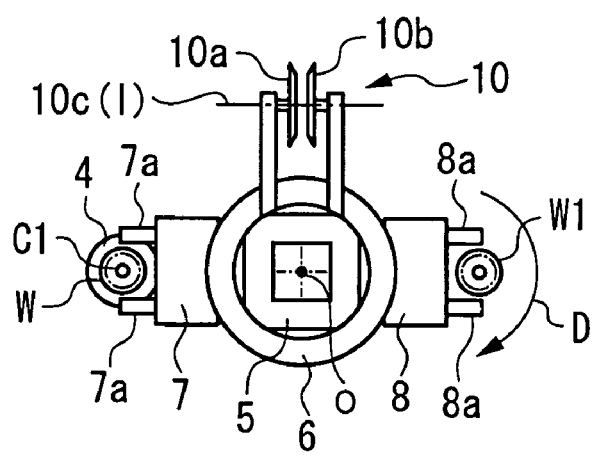
FIGS. 2(a) to 2(c) are plan views showing the surroundings of a counter column in the gear grinding machine.
Figure 2B:
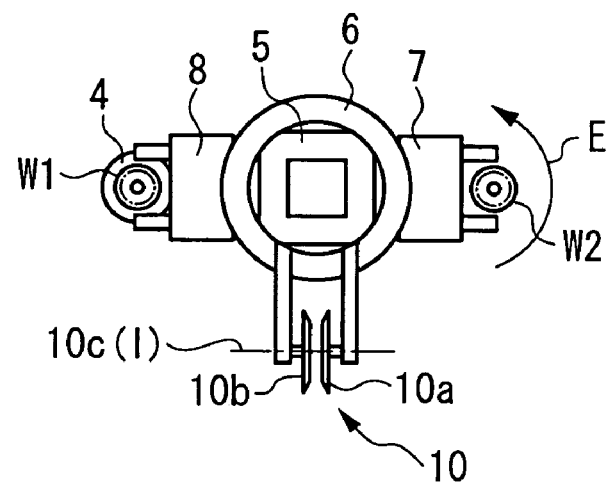
Figure 2C:
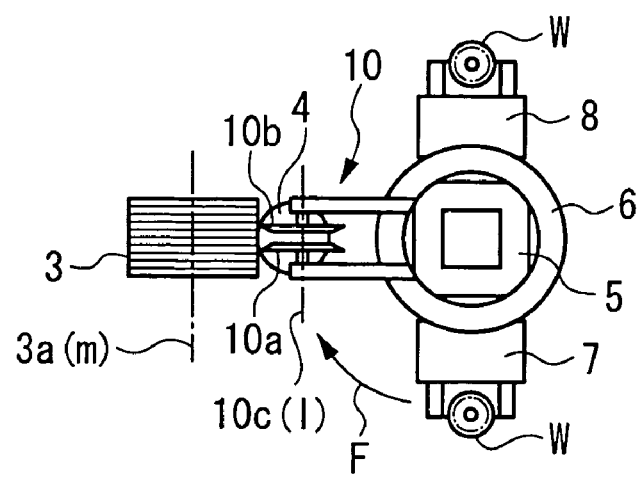

FIGS. 2(a) to 2(c) are explanation drawings of the surroundings of a counter column 5, as viewed from above, which is a tailstock for supporting an end of the work. FIGS. 2(a) and 2(b) show actions for carrying the work W into and out of a site on a table 4. FIG. 2(c) shows the state of dressing.

Figure 3:
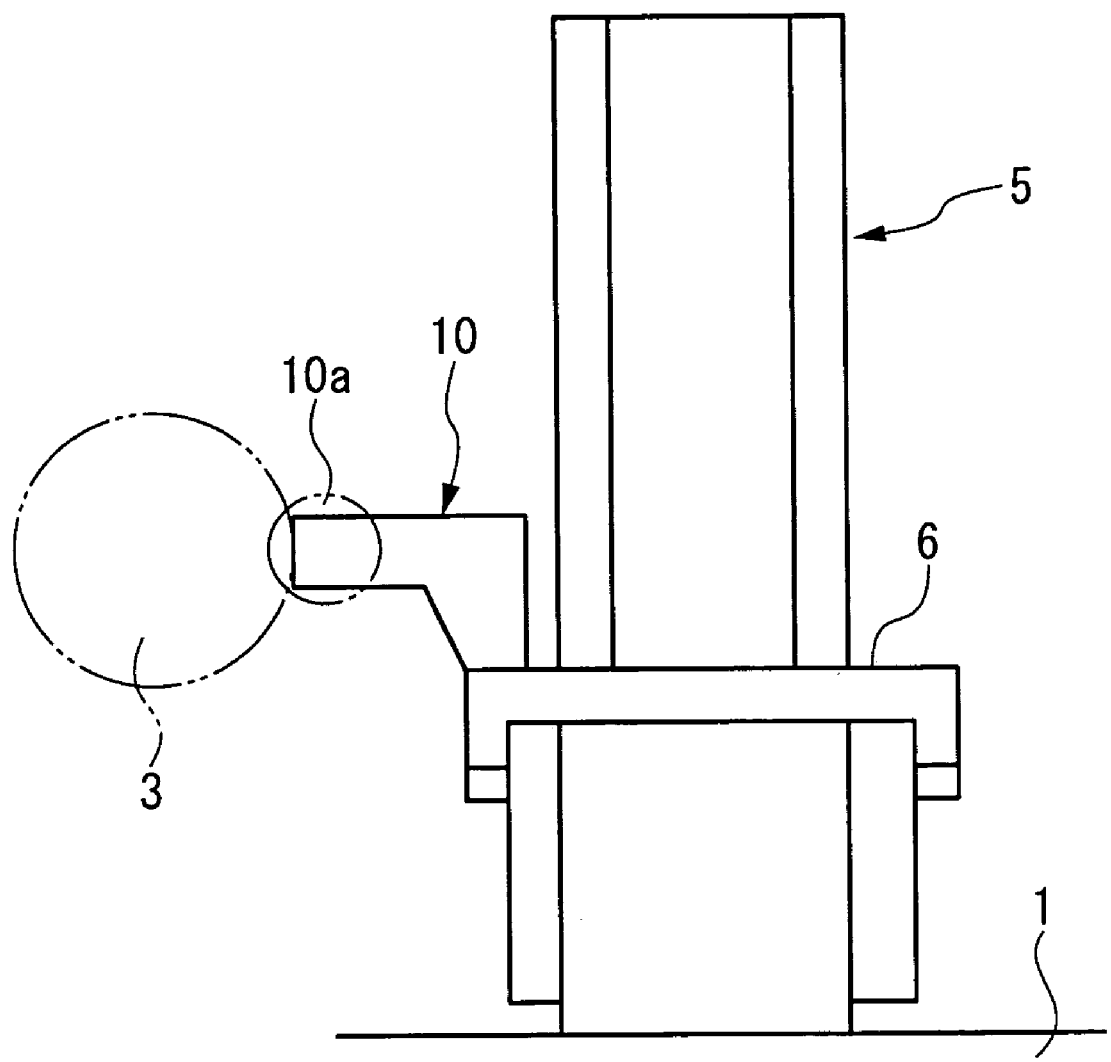
FIG. 3 is a side view showing the surroundings of the counter column in the gear grinding machine.

FIG. 3 is a side view of the counter column (tailstock) 5.

Figure 4:
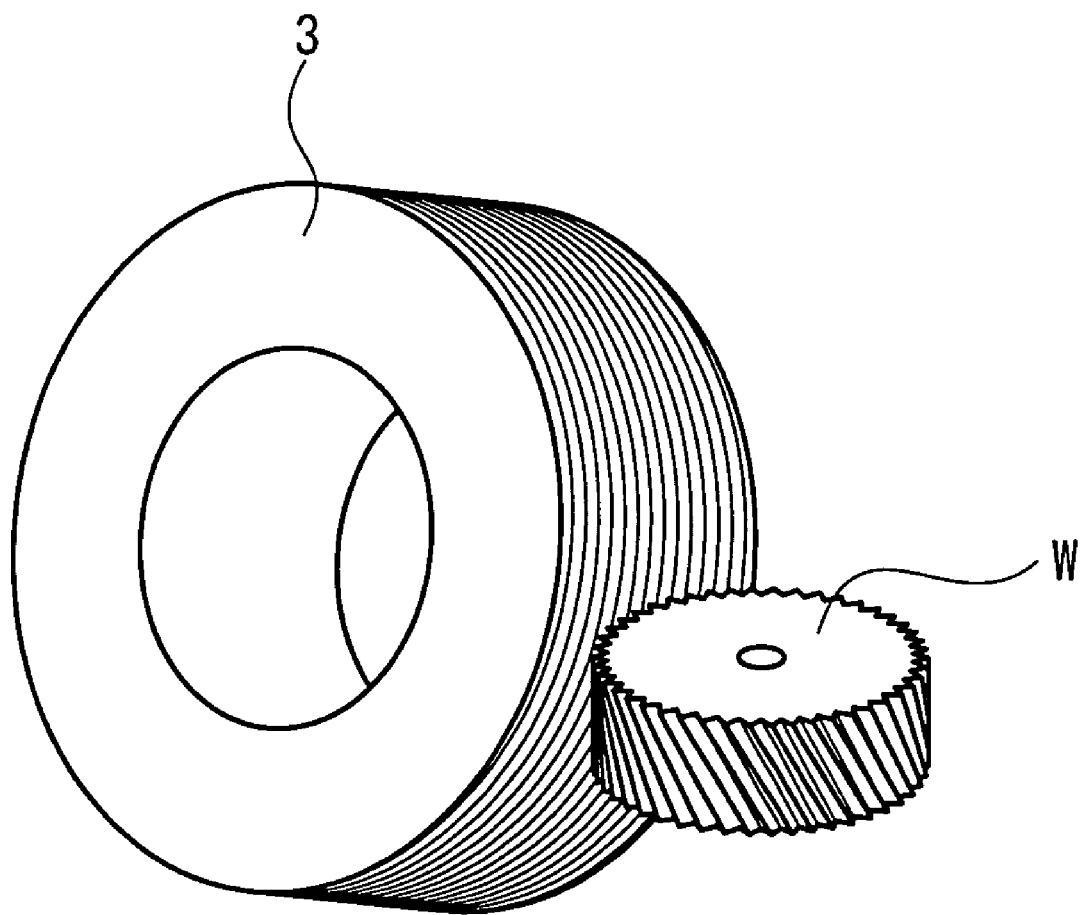
FIG. 4 is a perspective view showing the state of grinding a gear.

FIG. 4 is a perspective view showing a state in which the threaded grinding wheel 3 and the work W are in engagement for gear grinding.

Figure 5A:
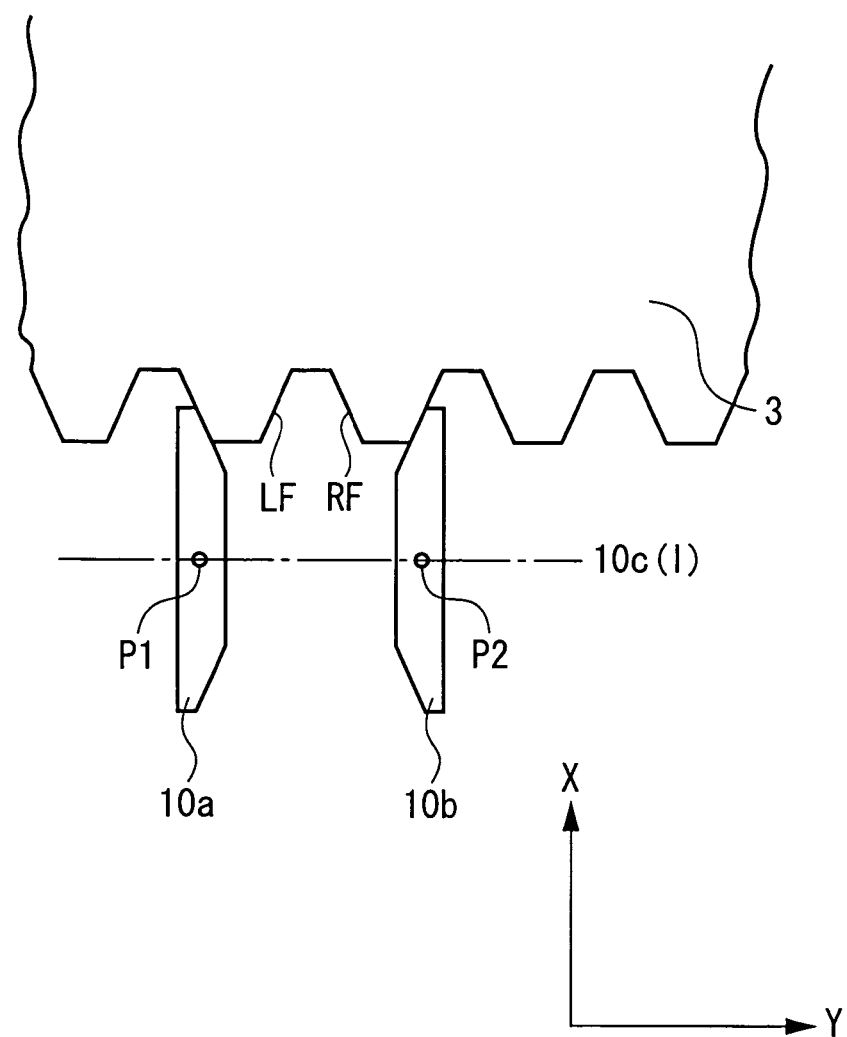
FIGS. 5(a) and 5(b) are schematic views showing the state of dressing.
Figure 5B:
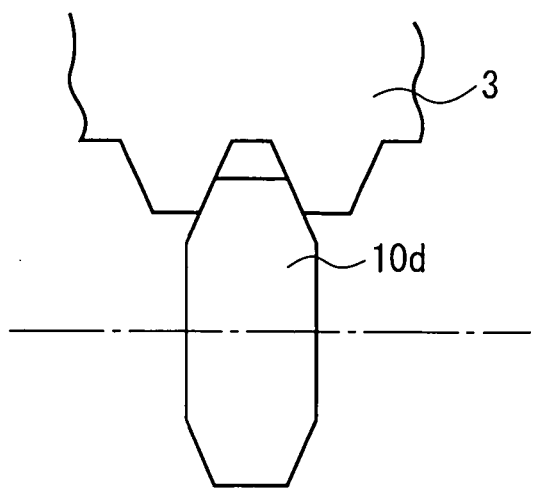

FIGS. 5(a) and 5(b) are schematic views showing the state of dressing.

In FIG. 1, reference numeral 1 is a bed, 2 is a column, 3 is the threaded grinding wheel for grinding the work, 4 is the table on which the work is placed and held, 5 is the counter column (tailstock) erected on the bed 1, 6 is a turning ring (annular member) revolvably provided on the outer periphery of a lower part of the counter column 5, 7 and 8 are grippers for carrying-in and carrying-out of the work, and 10 is the rotary dressing device for dressing the threaded grinding wheel 3.

The table 4 is provided at a position facing the column 2 (i.e., a work machining position), and the column 2 moves forward and backward on the bed 1 toward and away from a first axis C1 (table 4) shown in FIG. 2(a) (namely, the column 2 slides in an X-direction). The column 2 has a grinding spindle 14 as a grinding wheel shaft for mounting the threaded grinding wheel 3. The table 4 rotates in directions of arrows C about the first axis C1 shown in FIG. 2(a).

The counter column 5 has the function of pressing the work, placed on the table 4, from above, and has a tailstock instrument (not shown) which ascends and descends in an up-and-down direction above the surface of the table 4 to press the work from above.

As shown in FIG. 2(a), the turning ring (annular member) 6, which is turned about a second axis O in directions of arrows B (FIG. 1) by a drive means (not shown), is provided on the outer periphery of the counter column 5. The pair of grippers 7 and 8, which are holders of the work, and the rotary dressing device 10 are provided on the turning ring 6.

The pair of grippers 7 and 8 are provided symmetrically with respect to the second axis O for carrying the work W into and out of the site on the table 4. The grippers 7 and 8 have such a mechanism that a pair of opening and closing forks 7a, 7a or 8a, 8a grip the work W from both sides of it, and hold it.

The turning ring 6 is desirably provided on the outer periphery of the lower part of the counter column 5 in consideration of a height which makes it easy for the grippers 7, 8 to carry the work W into and out of the site on the table 4.

The rotary dressing device 10 is provided between the grippers 7 and 8, and is preferably provided at a central (90-degree) position between the grippers 7 and 8, with the second axis O as the center.

The rotary dressing device 10 is furnished with the pair of disk-shaped dressing tools 10a and 10b which are rotationally driven about a dresser axis 10c. In the descriptions to follow, the dresser axis 10c may be designated by the symbol "l".

The column 2 has, on a side surface (front surface) thereof facing the table 4, a vertical slide 11 slidable parallel to the first axis C1 (i.e., in a Z-direction), a turning head 12 capable of axially turning on the front surface of the vertical slide 11 in directions of arrows A (i.e., capable of turning about an X-axis and capable of turning in a Y-Z plane), and a grinding slider 13 sliding on the front surface of the turning head 12 in a direction perpendicular to the first axis C1 (i.e., in a Y-direction). The above axial turns in the A-direction mean motions which tilt the whole of the grinding spindle 14. The grinding spindle 14 rotates about a grinding wheel axis 3a, thereby enabling the work W to be ground by the threaded grinding wheel 3. In the descriptions to follow, the grinding wheel axis 3a may be designated by the symbol "m".

The bed 1, the column 2, the vertical slide 11, the turning head 12, the grinding slider 13, and the grinding spindle 14 constitute a moving mechanism, and the respective portions of this moving mechanism have their moving positions numerically controlled by an NC device 20.

The turning head 12 is provided with a coolant nozzle 9, through which a grinding fluid is discharged from above a site of grinding during grinding of the work W and the threaded grinding wheel 3 to ensure smoothness of grinding, exclusion of grinding swarf, and cooling.

The above-mentioned movements in the directions of X, Y, Z, A, and C, and the rotational driving of the threaded grinding wheel 3 by the grinding spindle 14 are numerically controlled by the NC device 20, whereby the threaded grinding wheel 3 grinds the work W on the table 4.

The carry-in, carry-out, and machining actions for the work W will be described based on FIGS. 2(*a*), 2(*b*) and 2(*c*).

FIG. 2(*a*) is a view showing a state in which the work W is carried into the site on table 4 on the side of the gripper 7, and the work W1 to be ground next is gripped on the side of the gripper 8.

The gripper 7 is lowered by a predetermined distance by a moving means (not shown) to install the work W at a work mounting instrument (work arbor) on the table 4. After gripping by the gripper 7 is released, the work W is fixed to and supported on the work arbor by a clamping device (not shown). Then, movements in the directions of X, Y, Z, A and C, and the rotational driving of the threaded grinding wheel 3 are numerically controlled, whereby the threaded grinding wheel 3 grinds the work W to produce a gear W2. FIG. 4 shows the state of the threaded grinding wheel 3 and the work W relative to each other during grinding.

Then, the fixing and support of the gear W2 on the work arbor are released, and the gear W2 is gripped by the gripper 7. The gripper 7 is raised by a predetermined distance by the moving means to separate the gear W2 from the work arbor. Then, the turning ring 6 is rotated clockwise (in a direction of an arrow D) through 180 degrees to attain the state shown in FIG. 2(*b*). At this time, the gripper 8 grips the work W1 to be ground next, and the gripper 8 carries the work W1 into the site on the table 4, and the gripper 7 carries the completed gear W2 out.

By repeating the actions shown in FIGS. 2(*a*) and 2(*b*) alternately, several tens of gears are produced continuously. Then, the turning ring 6 is turned from the state of FIG. 2(*b*) clockwise through 90 degrees in a direction of an arrow F to attain the states shown in FIG. 2(*c*) and FIG. 3. That is, the rotary dressing device 10 is brought face-to-face with the threaded grinding wheel 3. The dressing tools 10*a*, 10*b* are rotationally driven about the dresser axis 10*c*. Further, the movements in the directions of X, Y, Z, A, and C and the rotational driving of the threaded grinding wheel 3 are numerically controlled in the same manner as for machining of the work W, whereby the threaded grinding wheel 3 is ground by the dressing device 10 for regeneration.

The timing of dressing of the threaded grinding wheel 3 by the rotary dressing device 10 is set beforehand in the NC device 20 of the gear grinding machine before execution of grinding, with the number of the works W to be ground continuously by the threaded grinding wheel 3 being set at a predetermined number. By so doing, the actions shown in FIGS. 2(*a*) and 2(*b*) are repeated alternately so that the threaded grinding wheel 3 machines the predetermined number of the works W continuously. After the predetermined number of the works W are continuously machined, the turning ring 6 is turned and brought to the state of FIG. 2(*c*). As a result, the rotary dressing device 10 faces the threaded grinding wheel 3, making it possible for the rotary dressing device 10 to dress the threaded grinding wheel 3.

Dressing is performed by rotationally driving the dressing tools 10*a* and 10*b* about the dresser axis 10*c*, and numerically controlling the movements in the directions of X, Y, Z, A, and C and the rotational driving of the threaded grinding wheel 3.

In this manner, the disk-shaped dressing tools 10*a* and 10*b* being rotationally driven are brought into contact with the flanks of the threads of the threaded grinding wheel 3 being rotated, whereby dressing of the threaded grinding wheel 3 can be carried out.

FIG. 5(*a*) schematically shows a state in which the threaded grinding wheel 3 is dressed by the dressing tools 10*a*, 10*b*.

In FIG. 5(*a*), assume that the dressing tool 10*a* can turn (turn about the Z-axis) about a position P1, and the dressing tool 10*b* can turn (turn about the Z-axis) about a position P2. In this case, the wheel pressure angle of the threaded grinding wheel 3 can be modified by turning the dressing tools 10*a*, 10*b* about the Z-axis.

With the aforementioned gear grinding machine having a block gauge, the wheel pressure angle can be modified by such a technique.

In the embodiments of the present invention, even if the dressing tools 10*a*, 10*b* can be turned about the Z-axis, the wheel pressure angle of the threaded grinding wheel 3 is changed, without turning the dressing tools 10*a*, 10*b*. According to the embodiments of the present invention, moreover, even if the dressing tools 10*a*, 10*b* cannot be turned about the Z-axis, the wheel pressure angle of the threaded grinding wheel 3 is changed.

According to the embodiments of the present invention, with the position of the rotary dressing device 10 (i.e., dressing tools 10*a*, 10*b*) being fixed, and the dressing tools 10*a*, 10*b* being kept in contact with the flanks of the threads of the threaded grinding wheel 3, the threaded grinding wheel 3 is located at a predetermined position in an orthogonal coordinate system (in a direction along the X-axis and the Z-axis), and the threaded grinding wheel 3 is turned through a predetermined angle in the direction of the arrow A. By these measures, the wheel pressure angle of the threaded grinding wheel 3 to be dressed by the dressing tools 10*a*, 10*b* is changed.

In other words, "the positions of the dressing tools 10*a*, 10*b* are fixed, while the orthogonal coordinate position and the turning angle in the direction of the arrow A of the threaded grinding wheel 3 are changed". This procedure attains a state equivalent to the state in which "the position of the threaded grinding wheel 3 is fixed, while the dressing tools 10*a*, 10*b* are turned about the Z-axis", in order to change the wheel pressure angle.

A single dressing tool 10*d* as shown in FIG. 5(*b*) can be employed. This dressing tool 10*d* can perform dressing upon contact with the right and left flanks RF and LF of the threaded grinding wheel 3, as do the pair of dressing tools 10*a* and 10*b*.

EMBODIMENT 1

Embodiment 1 of the present invention applied to the gear grinding machine shown in FIGS. 1 to 5(*a*), 5(*b*) will be described with reference to FIGS. 6(*a*) to 6(*c*).

In performing ordinary dressing, a line connecting the center $O_1$ of the threaded grinding wheel 3 (the central point of the grinding wheel axis 3*a*(m)) and the center $O_2$ of the dressing tools 10*a*, 10*b* (the central point of the dresser axis 10*c*(l)) is rendered horizontal, as shown in FIG. 6(*a*). At this time, a center distance, which is the distance between the centers $O_1$ and $O_2$, is D.

To change the wheel pressure angle of the threaded grinding wheel 3, the positions of the dressing tools 10*a*, 10*b* are fixed at the same positions as in FIG. 6(*a*), and the center distance as the distance between the centers $O_1$ and $O_2$ is kept to be D (namely, the dressing tools 10*a*, 10*b* are kept in contact with the flanks of the threads of the threaded grinding wheel 3). Under these conditions, the position in the X-direction and the position in the Z-direction of the threaded grinding wheel 3 are changed, and the position in the A-direction of the threaded grinding wheel 3 (its turning position about the X-axis, namely, its turning position in the Y-Z plane) is also changed, for example, as shown in FIG. 6(*b*). In the example of FIG. 6(*b*), the threaded grinding wheel 3 and the dressing tools 10*a*, 10*b* are in contact at the lower-half portions of the threads of the threaded grinding wheel 3.

Thus, for example, the wheel pressure angle at the right flank RF (see FIG. 5(*a*)) of the threaded grinding wheel 3 dressed by the dressing tool 10*a* is large, and the wheel pressure angle at the left flank LF (see FIG. 5(*a*)) of the threaded grinding wheel 3 dressed by the dressing tool 10*b* is small, although this is dependent partly on the direction of inclination of the threads formed in the threaded grinding wheel 3.

At this time, the increase (numerical value) in the wheel pressure angle at the right flank RF is equal to the decrease (numerical value) in the wheel pressure angle at the left flank LF.

The results of analysis of how much the threaded grinding wheel 3 is moved along its positions in the directions of X, Z, and A in order to change the wheel pressure angle by a predetermined angle will be described later on.

It goes without saying that the threaded grinding wheel 3 is moved along its positions in the directions of X, Z, and A by moving the column 2, the vertical slide 11, and the turning head 12 while controlling their positions in the NC mode by the NC device 20.

In carrying out dressing, the positions of the threaded grinding wheel 3 in the directions of X, Z, and A are maintained in the state shown in FIG. 6(*b*), and contact adjustment is made (namely, the threaded grinding wheel 3 is moved in the Y-direction) until the dressing tools 10*a*, 10*b* contact the flanks of the threads of the threaded grinding wheel 3. Then, the threaded grinding wheel 3 is continuously lead-fed in the Y-direction in accordance with the lead of the threads formed in the threaded grinding wheel 3.

To change the wheel pressure angle of the threaded grinding wheel 3 in a direction opposite to the direction shown in FIG. 6(*b*), the positions of the dressing tools 10*a*, 10*b* are fixed at the same positions as in FIG. 6(*a*), and the center distance as the distance between the centers $O_1$ and $O_2$ is kept to be D. Under these conditions, the position in the X-direction and the position in the Z-direction of the threaded grinding wheel 3 are changed, and the position in the A-direction of the threaded grinding wheel 3 (its turning position about the X-axis, namely, its turning position in the Y-Z plane) is also changed, for example, as shown in FIG. 6(*c*). In the example of FIG. 6(*c*), the threaded grinding wheel 3 and the dressing tools 10*a*, 10*b* are in contact at the upper-half portions of the threads of the threaded grinding wheel 3.

Thus, for example, the wheel pressure angle at the right flank RF (see FIG. 5(*a*)) of the threaded grinding wheel 3 dressed by the dressing tool 10*a* is small, and the wheel pressure angle at the left flank LF (see FIG. 5(*a*)) of the threaded grinding wheel 3 dressed by the dressing tool 10*b* is large, although this is dependent partly on the direction of inclination of the threads formed in the threaded grinding wheel 3.

At this time, the decrease (numerical value) in the wheel pressure angle at the right flank RF is equal to the increase (numerical value) in the wheel pressure angle at the left flank LF.

The results of analysis of how much the threaded grinding wheel 3 is moved along its positions in the directions of X, Z, and A in order to change the wheel pressure angle by a predetermined angle will be described later.

It goes without saying that the threaded grinding wheel 3 is moved along its positions in the directions of X, Z, and A by moving the column 2, the vertical slide 11, and the turning head 12 while controlling their positions in the NC mode by the NC device 20.

In carrying out dressing, the positions of the threaded grinding wheel 3 in the directions of X, Z, and A are maintained in the state shown in FIG. 6(*c*), and contact adjustment is made (namely, the threaded grinding wheel 3 is moved in the Y-direction) until the dressing tools 10*a*, 10*b* contact the flanks of the threads of the threaded grinding wheel 3. Then, the threaded grinding wheel 3 is continuously lead-fed in the Y-direction in accordance with the lead of the threads formed in the threaded grinding wheel 3.

In this manner, the wheel pressure angle at the right flank and that at the left flank of the threaded grinding wheel 3 can be increased for one of the right and left flanks, and decreased for the other flank. Furthermore, the increase and the decrease (numerical values) in the wheel pressure angle can be equated with each other.

EMBODIMENT 2

In Embodiment 1, the increase (decrease) in the wheel pressure angle (numerical value) at the right flank RF and the decrease (increase) in the wheel pressure angle (numerical value) at the left flank LF are rendered equal. In Embodiment 2, on the other hand, the increase and decrease in the wheel pressure angles (numerical values) at the right and left flanks are rendered different.

In Embodiment 1, therefore, the distance over which the threaded grinding wheel 3 is continuously moved in the Y-direction (moving distance in the Y-direction per rotation) during dressing is equated with the lead of the threads formed in the threaded grinding wheel 3. In Embodiment 2, by contrast, the distance over which the threaded grinding wheel 3 is continuously moved in the Y-direction (moving distance in the Y-direction per rotation) during dressing is rendered slightly longer or shorter than the lead of the threads formed in the threaded grinding wheel 3.

As has been well known thus far, if the moving distance of the threaded grinding wheel 3 in the Y-direction per rotation is longer than the lead of the threads of the threaded grinding wheel 3, the wheel pressure angles at the right and left flanks RF and LF of the threaded grinding wheel 3 dressed by the dressing tools 10*a*, 10*b* are both decreased by the same angle (numerical value), for example, although this is also dependent on the direction of the inclination of the threads formed in the threaded grinding wheel 3. If the moving distance of the threaded grinding wheel 3 in the Y-direction per rotation is shorter than the lead of the threads of the threaded grinding wheel 3, on the other hand, the wheel pressure angles at the right and left flanks RF and LF of the threaded grinding wheel 3 dressed by the dressing tools 10*a*, 10*b* are both increased by the same angle (numerical value), for example, although this is also dependent on the direction of the inclination of the threads formed in the threaded grinding wheel 3.

Furthermore, as shown in FIG. 6(*b*) or 6(*c*), with the positions of the dressing tools 10*a*, 10*b* being fixed at the same positions as in FIG. 6(*a*), and the center distance as the distance between the centers $O_1$ and $O_2$ being kept to be D, the position in the X-direction and the position in the Z-direction of the threaded grinding wheel 3 are changed, and the position in the A-direction of the threaded grinding wheel 3 (its turning position about the X-axis, namely, its turning position in the Y-Z plane) is also changed. By so doing, one of the wheel pressure angles at the right and left flanks RF and LF can be increased, and the other wheel pressure angle can be decreased, as stated earlier.

Figure 6A:
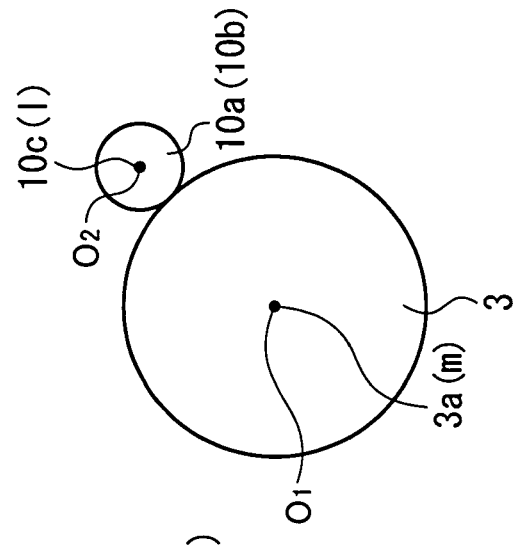
FIGS. 6(a) to 6(c) are explanation drawings showing the states of an embodiment of the present invention.

Thus, (1) The moving distance of the threaded grinding wheel 3 in the Y-direction per rotation is adjusted; and (2) With the positions of the dressing tools 10a, 10b being fixed at the same positions as in FIG. 6(a), and the center distance as the distance between the centers $O_1$ and $O_2$ being kept to be D, the position in the X-direction, the position in the Z-direction, and the position in the A-direction of the threaded grinding wheel 3 are changed.

By taking these measures, the wheel pressure angles at the right and left flanks RF and LF can be increased or decreased to arbitrary angles.

Next, how much the threaded grinding wheel 3 should be moved along the directions of X, Z, and A in order to change the wheel pressure angle of the threaded grinding wheel 3 by a predetermined angle will be analytically described.

Usually, a vector is designated by showing an arrow (→) above the relevant symbol. However, such a notation method is not permitted under the electronic application system of the Japanese Patent Office. Thus, an underline provided below the relevant symbol is used as indicating a vector.

Figure 7:
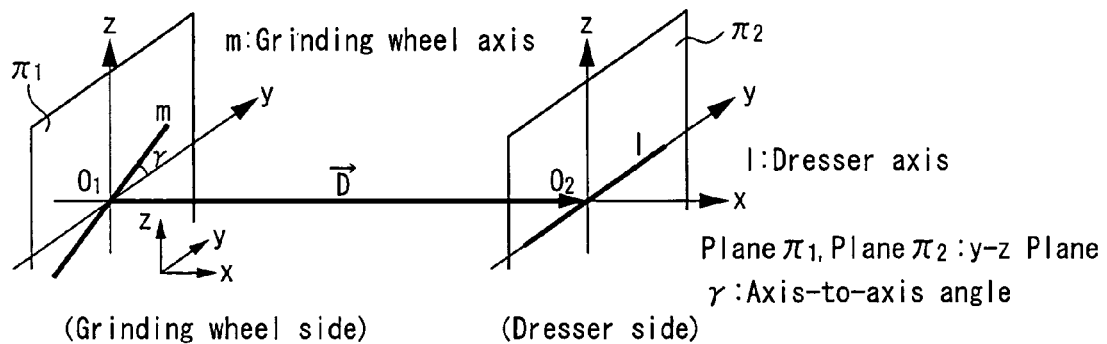
FIG. 7 is an explanation drawing showing the positional relationship between a threaded grinding wheel and a rotary dressing device.

FIG. 7 shows the positional relationship between the threaded grinding wheel 3 and the dressing tools 10a, 10b of the rotary dressing device 10. In more detail, this is a positional relation when a line connecting the center $O_1$ of the threaded grinding wheel 3 and the center $O_2$ of the dressing tools 10a, 10b is horizontal, as shown in FIG. 6(a).

In FIG. 7, m denotes the grinding wheel axis, 1 denotes the dresser axis, and a plane $\pi_1$ and a plane $\pi_2$ are each a y-z plane. At this time, the following conditions A and B hold:

Condition A: Center distance D (Vector over the shortest distance $\underline{O_1O_2}=\underline{D}$, $|\underline{D}|=D$)

Condition B: Angle between the dresser axis L and the grinding wheel axis m is γ (γ: axis-to-axis angle).

If the plane $\pi_2$ is translated along $\underline{D}$, the plane $\pi_2$ overlaps the plane $\pi_1$.

$\underline{D}$ is a normal vector for $\pi_1$ and $\pi_2$.

Figure 8:
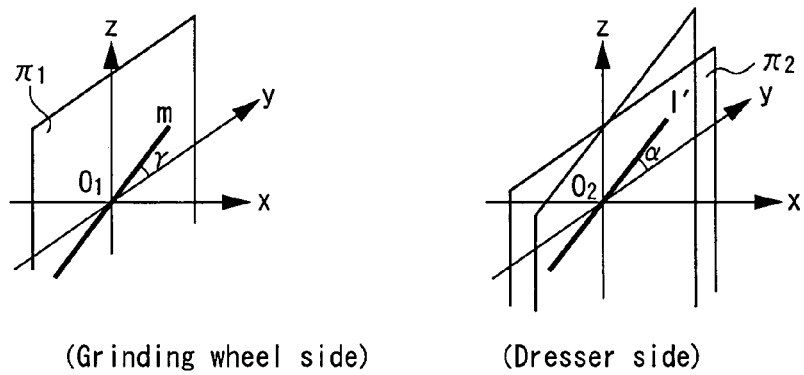
FIG. 8 is an explanation drawing showing the positional relationship between the threaded grinding wheel and the rotary dressing device.

FIG. 8 shows the positional relationship between the threaded grinding wheel 3 and the dressing tools 10a, 10b of the rotary dressing device 10 when the dressing tools 10a, 10b are turned about the Z-axis (turning angle a) in order to modify the wheel pressure angle.

This mode is a technique so far employed, and this mode is called mode 1.

Figure 6B:
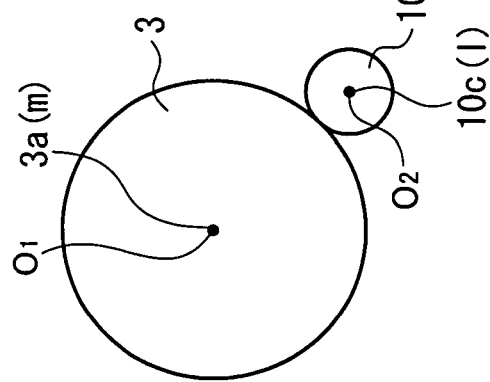
Figure 6C:
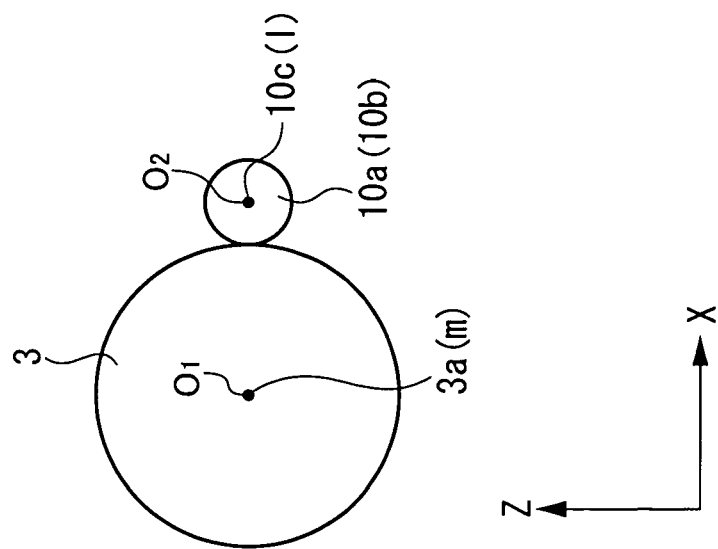
Figure 9:
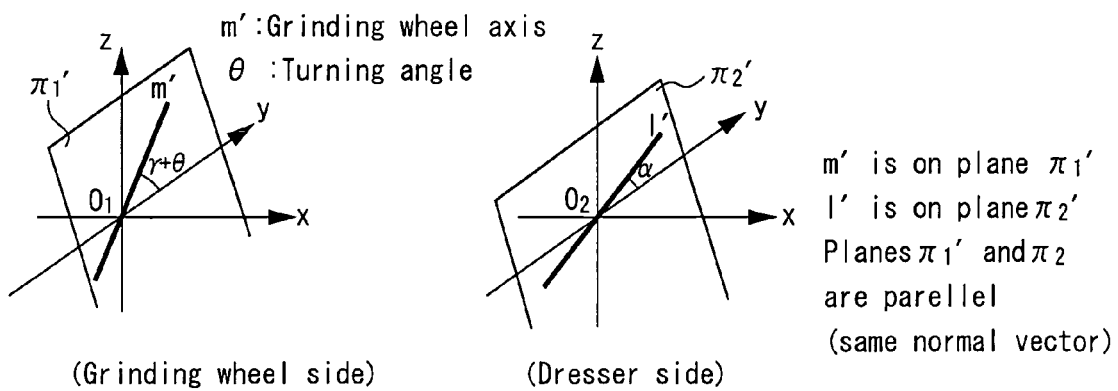
FIG. 9 is an explanation drawing showing the positional relationship between the threaded grinding wheel and the rotary dressing device.

FIG. 9 shows the positional relationship between the threaded grinding wheel 3 and the dressing tools 10a, 10b of the rotary dressing device 10 when the position in the X-direction, the position in the Z-direction, and the position in the A-direction of the threaded grinding wheel 3 are changed, with the positions of the dressing tools 10a, 10b being fixed, and the center distance D being kept, as shown in FIG. 6(b) or FIG. 6(c).

FIG. 9 shows a mode in which the grinding wheel axis is rotated (turned) in the y-z plane, and is also translated. This mode is called mode 2. In mode 2, the act of "rotating (turning) in the y-z plane and also translating" as mentioned above is taken as mapping T.

m' denotes the grinding wheel axis, and θ is a turning angle in the y-z plane. The grinding wheel axis m' is on a plane $\pi_1'$, the dresser axis l' is on a plane $\pi_2'$, and the plane $\pi_1'$ and the plane $\pi_2'$ are parallel to each other (namely, they have the same normal vector)

If mapping T, which fulfills the following conditions A' and B', mode 1 and mode 2 are equivalent to each other:

Condition A': Center distance D (shortest distance between l' and m'=D)

Condition B': Angle between the dresser axis l' and the grinding wheel axis m' is γ (γ: axis-to-axis angle).

(axis-to-axis angle γ is an angle which l' and m' make with each other when the plane $\pi_2'$ is translated to overlap the plane $\pi_1'$)

Whether the above-described mapping T exists is shown by the following calculations:

Direction vector of straight line m $\underline{dm}=(0, \cos γ, \sin γ)$

Position vector of straight line m $\underline{m}=s\cdot\underline{dm}$ (s is a parameter)

Direction vector of straight line l $\underline{dl}=(0,1,0)$

Position vector of straight line l $\underline{l}=\underline{D}+t\underline{dl}$ (t is a parameter)

$\underline{D}=(D,0,0)$

The direction vector $\underline{dl'}$ of the straight line l' is shown by the following equation (1):

$$\underline{dl'} = \begin{pmatrix} \cos α & -\sin α & 0 \\ \sin α & \cos α & 0 \\ 0 & 0 & 1 \end{pmatrix} \begin{pmatrix} 0 \\ 1 \\ 0 \end{pmatrix} \begin{pmatrix} -\sin α \\ \cos α \\ 0 \end{pmatrix} \quad (1)$$

The direction vector $\underline{dm'}$ of the straight line m' is shown by the following equation (2):

$$\underline{dm'}=(0, \cos(γ+θ), \sin(γ+θ)) \quad (2)$$

Let a vector perpendicular to the straight line l' and the straight line m' be $\underline{n'}$. $\underline{n'}$ is a normal vector for the planes $\pi_L'$ and $\pi_2'$.

$$\underline{n'}=\underline{dl'}\times\underline{dm'}=(\cos α\cdot\sin(γ+θ), \sin α\cdot\sin(γ+θ), -\sin α\cdot\cos(γ+θ)) \quad (3)$$

$$|\underline{n'}|^2 = \cos^2 α \sin^2(γ+θ) + \sin^2 α \cdot \sin^2(γ+θ) + \sin^2 α\cos^2(γ+θ) \quad (4)$$
$$= \cos^2 α\sin^2(γ+θ) + \sin^2 α$$

Let the angle between the straight line l' and the straight line m' be γ. Then, according to the theorem of outer product, $$|\underline{n'}|=|\underline{dl'}|\cdot|\underline{dm'}|\sin γ=\sin γ \quad (5)$$

$$(\because |\underline{dl'}|=|\underline{dm'}|=1)$$

From the equation (4) and the equation (5), $$\cos^2 α \sin^2(γ+θ)+\sin^2 α=\sin^2 γ \quad (6)$$

From the equation (6), the turning angle θ that fulfills the condition B' is obtained.

From the equation (3) and the equation (5), the normal vector $\underline{n'}$ is normalized as follows:

$$n'=(1/|\sin γ|)(\cos α\cdot\sin(γ+θ), \sin α\cdot\sin(γ+θ), -\sin α\cdot\cos(γ+θ)) \quad (7)$$

Let a point translated from the point $O_2$ on the straight line l' by a distance D along $-\underline{n'}$ be $O_1'$. The straight line m', which passes the point $O_1'$ and has a direction vector $\underline{m'}$, fulfills the conditions A' and B'.

$$\underline{O_2O_1'}=-D\cdot\underline{n'}=(-D/|\sin γ|)(\cos α \sin(γ+θ), \sin α \sin(γ+θ), -\sin α \cos(γ+θ)) \quad (8)$$

$$\underline{O_1O_1'}=\underline{O_1O_2}+\underline{O_2O_1'}=D(1-\cos α \sin(γ+θ)/|\sin γ|, -\sin α \sin(γ+θ)/|\sin γ|, \sin α \cos(γ+θ)/|\sin γ|) \quad (9)$$

Based on the above, mapping T is defined as follows:
Straight line m→straight line m' m=sdm→m'=O₁O₂+sdm'

The respective axis correction amounts of the threaded grinding wheel 3 when the positions of the dressing tools 10a, 10b are fixed are obtained from inverse mapping $T^{-1}$.

$$T = \begin{bmatrix} 1 & 0 & 0 & xh \\ 0 & \cos\theta & -\sin\theta & yh \\ 0 & \sin\theta & \cos\theta & zh \\ 0 & 0 & 0 & 1 \end{bmatrix} \quad (10)$$

O₁O₁'=(x_h, y_h, z_h)

In this case, inverse mapping $T^{-1}$ is given below.

$$T^{-1} = \begin{bmatrix} 1 & 0 & 0 & -xh \\ 0 & \cos\theta & \sin\theta & -yh\cdot\cos\theta - zh\cdot\sin\theta \\ 0 & -\sin\theta & \cos\theta & yh\cdot\sin\theta - zh\cdot\cos\theta \\ 0 & 0 & 0 & 1 \end{bmatrix} \quad (11)$$

From the equation (11), the respective axis correction amounts of the threaded grinding wheel 3 are as follows:

$$X = -x_h \quad (12)$$

$$Y = -y_h\cdot\cos\theta - z_h\cdot\sin\theta \quad (13)$$

$$Z = y_h\cdot\sin\theta - z_h\cdot\cos\theta \quad (14)$$

$$A = -\theta \quad (15)$$

A prerequisite to these correction amounts is that the amount (angle) of modification of the wheel pressure angle be smaller than the axis-to-axis angle γ.

As will be understood from the equations (12), (14), and (15), with the positions of the dressing tools 10a, 10b being fixed, the X-axis position of the threaded grinding wheel 3 is displaced by $-x_h$, the Z-axis position of the threaded grinding wheel 3 is displaced by $y_h\cdot\sin\theta - z_h\cdot\cos\theta$, and the position in the A-direction of the threaded grinding wheel 3 is turned by $-\theta$. By so doing, the wheel pressure angle can be modified in the same manner as when the dressing tools 10a, 10b are turned by α about the Z-axis, with the threaded grinding wheel 3 being fixed.

θ is a value which satisfies the equation (6). In the equation (6), γ is the angle which the grinding wheel axis and the dresser axis make with each other before the position of the threaded grinding wheel 3 is moved. The vector O₁O₁' is $(x_h, y_h, z_h)$.

Before the dresser action is started, the "contact adjustment" operation is performed by manually operating the position in the Y-axis direction of the threaded grinding wheel 3 until the threaded grinding wheel 3 and the dressing tools 10a, 10b make contact with each other.

As described above, the present invention can be applied to the gear grinding machine which allows the threaded grinding wheel to perform grinding, and which has the rotary dressing device for dressing the threaded grinding wheel. The present invention can be utilized for modifying the wheel pressure angle by numerical control with high accuracy.

According to the present invention, moreover, with the position of the dressing device (dressing tool) being fixed, and the dressing tool being kept in contact with the flank of the thread of the threaded grinding wheel, the position in the X-direction, the position in the Z-direction, and the turning position in the Y-Z plane of the threaded grinding wheel are numerically controlled, whereby the wheel pressure angle formed by dressing is modified. Since the wheel pressure angle can thus be modified by numerical control, modification of the wheel pressure angle can be automatically made with high accuracy under NC program control.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear grinding machine, comprising:
a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to a work machining position, a Z-direction being a vertical direction, and a Y-direction being a direction perpendicular to the X-direction and the Z-direction, and to turn the threaded grinding wheel in a Y-Z plane;
an NC device for numerically controlling movement of the moving mechanism in order to control a position of the threaded grinding wheel mounted on the moving mechanism; and
a rotary dressing device having a disk-shaped dressing tool, and arranged such that when the rotary dressing device is set at the work machining position, the dressing tool contacts flanks of the threads of the threaded grinding wheel, while being rotationally driven, to perform dressing,
wherein the NC device has a control function of numerically controlling the moving mechanism so as to adjust a position in the X-direction, a position in the Z-direction, and a turning position in the Y-Z plane of the threaded grinding wheel, while keeping a state of contact of the dressing tool with the flanks of the threads of the threaded grinding wheel, in order to modify a wheel pressure angle of the threaded grinding wheel.

2. A gear grinding machine, comprising:
a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to a work machining position, a Z-direction being a vertical direction, and a Y-direction being a direction perpendicular to the X-direction and the Z-direction, and to turn the threaded grinding wheel in a Y-Z plane;
an NC device for numerically controlling movement of the moving mechanism in order to control a position of the threaded grinding wheel mounted on the moving mechanism; and
a rotary dressing device having a disk-shaped dressing tool, and arranged such that when the rotary dressing device is set at the work machining position, the dressing tool contacts flanks of the threads of the threaded grinding wheel, while being rotationally driven, to perform dressing, wherein the NC device has a control function of numerically controlling the moving mechanism so as to adjust a position in the X-direction, a position in the Z-direction, and a turning position in the Y-Z plane of the threaded grinding wheel, while keeping a state of contact of the dressing tool with the flanks of the threads of the threaded grinding wheel, and has a control function of numerically controlling a moving distance in the Y-direction of the threaded grinding wheel per rotation of the threaded grinding wheel, in order to modify a wheel pressure angle of the threaded grinding wheel.

* * * * *